Figure 1:
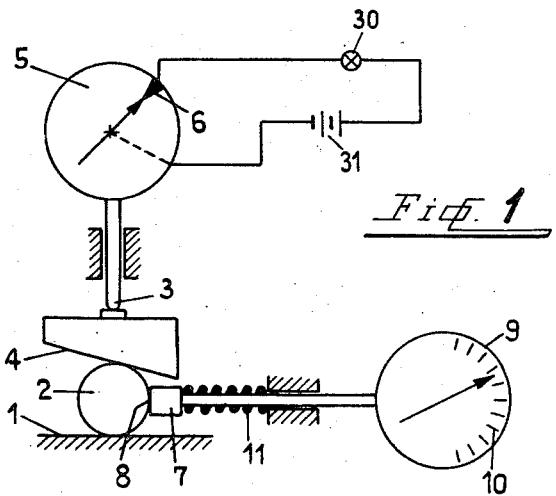

April 23, 1957     K. M. HARDER     2,789,693
GAUGING AND SORTING DEVICE

Filed April 27, 1951     2 Sheets-Sheet 1

INVENTOR:
KARL MAX HARDER

April 23, 1957 K. M. HARDER 2,789,693
GAUGING AND SORTING DEVICE
Filed April 27, 1951 2 Sheets-Sheet 2

INVENTOR:
KARL MAX HARDER

2,789,693

GAUGING AND SORTING DEVICE

Karl Max Harder, Vaduz, Liechtenstein

Application April 27, 1951, Serial No. 223,266

Public Law 619, August 23, 1954
Patent expires November 23, 1969

14 Claims. (Cl. 209—88)

This invention relates to gauging objects and for sorting same.

It is well known that in many cases articles or objects produced in series, in particular work pieces and the like, must be gauged with regard to one or several geometrical dimensions so as to be thereafter sorted in groups, each of said groups falling within predetermined very close permissible limits. With means known hitherto such gauging and sorting, respectively, was carried out either only inaccurately or with a considerable expenditure of time.

The present invention enables the gauging and sorting of articles according to a practically unlimited number of tolerance groups in a single operation. It is therefore an object of the invention to provide a novel and efficient apparatus facilitating gauging and sorting of articles or objects, in particluar work pieces and the like, with regard to several tolerance groups of geometrical dimensions. According to the invention the test piece is used for connecting two gauging elements independent of each other, one of said elements being used for selection of one of the prevailing tolerance groups and the other of said elements for influencing this selection according to the absolute size of the determining dimension of a standard test piece in such a manner that the last-named gauging element automatically causes the result determined by the other gauging element to become effective.

The apparatus according to the invention comprises two gauging elements independent of each other and arranged to determine a geometrical dimension, said gauging elements being connectable with each other by means of the test piece, and means for automatically causing the result determined by one of the gauging elements to become effective for the selection of one of the available tolerance groups on a certain contacting of the other gauging element caused by a standard test piece having the absolute size of the determining dimension.

Figure 2:
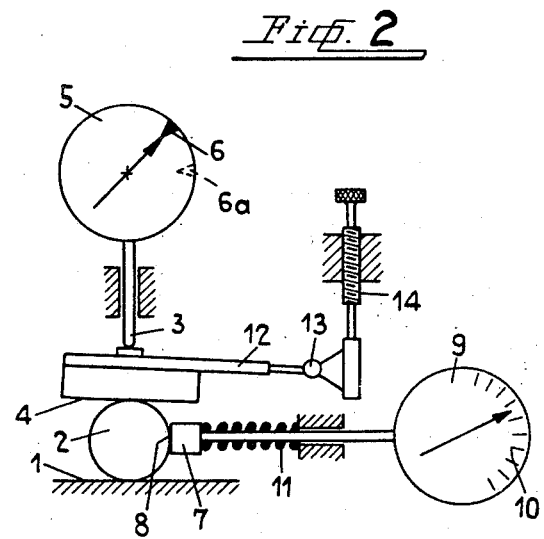
Figure 3:
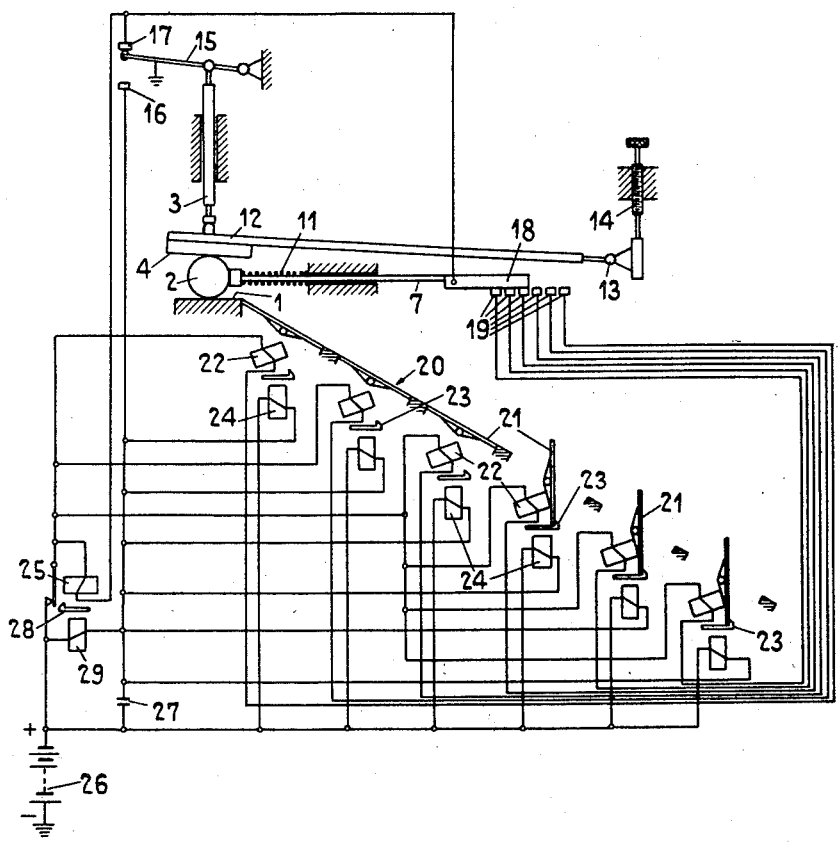

Further objects of the invention will become apparent from the detailed description of an embodiment of the present invention which will now be described by way of example with reference to the accompanying drawings in order that the invention be better understood and readily carried into effect. In the drawings:

Fig. 1 is a first example of embodiment of the device with an indicating device for causing the gauging result to become visible, Fig. 2 is an alternative thereto with which the absolute size of the tolerance groups can be changed, and Fig. 3 illustrates schematically a partly electrically operable embodiment for automatic mechanical sorting.

The device or apparatus illustrated in Fig. 1 has a horizontal guiding plane 1 along which an object to be gauged, such as a shaft 2, can be displaced. A first calipering element 3 is arranged displaceably in a direction lying at right angles to the guiding plane 1 and is provided with a calipering surface 4 arranged at an inclination to the guiding plane. The calipering element 3 is in operative connection with a mechanically coupled indicating device 5, having the shape of a clock the dial of which has a single mark 6 which constitutes an electric contact element and coacts with the hand of the clock serving as a moveable contact element. A second calipering element 7 is adapted for displacement in a direction parallel to the guiding plane 1 and in a plane common to the first calipering element 3 and arranged at right angles to the inclined calipering surface 4 and provided with a calipering surface 8 arranged at right angles to the path of motion of said second calipering element 7. This calipering element 7 is likewise in operative connection with a mechanically operated indicator 9 by which the displacement of said element 7 is made perceivable when an electric lamp 30 is alight, said lamp being connected to the terminals of a current source 31 by the interconnection of the contact mark 6 and the hand of the other indicator 5. The dial of the indicator 9 has several markings 10, demarcating several tolerance groups from one another. Whereas the first calipering element 3 always has the tendency to push its calipering surface downwardly under the influence of gravity the second calipering element 7 is provided with a spring 11 to continuously force it resiliently in axial direction of element 7 as seen in Fig. 1. The two calipering elements 3 and 7 are completely independent from each other but are connected to each other during the gauging operation by means of the object 2 to be gauged.

If the test piece 2 is translatorily displaced to the right on the guiding surface 1, said test piece comes then into contact with the calipering surfaces of the two calipering elements. The movement of the test piece actually takes place in such a manner that the dimensions decisive for the particular gauging thereof lie in a plane including the direction of motion. With a shaft for example, which is to be sorted in accordance to its diameter, the displacement must therefore take place at right angles to the longitudinal axis of said shaft.

In Fig. 1 the test piece 2 is displaced to the right on the guiding surface 1 until the hand of the indicator 5 reaches the mark 6 mentioned due to the displacement of the calipering element 3 during a calipering operation and thereby closes the current circuit of the lamp 30. At the same time the other calipering element 7 was displaced to a certain amount or extent in the direction of motion or insertion of the object 2 into a gap defined by said displaceable element 3 and said fixed guiding surface 1 so that the hand on the indicator 9 shows a deflexion which deflexion corresponds to the deviation of the geometrical dimension under consideration of the object 2 from a standard dimension—in the present example the diameter of the aforesaid shaft. The indication of the indicator 9 in relation to the mark 10 which becomes visible on lighting up the lamp 30 indicates the tolerance group to which the object thus gauged belongs.

If subsequently, for example, a larger but geometrically similar test piece is moved to the right along the gauging surface 1 into the aforesaid gap, in a like manner, the hand of the indicator 5 reaches the mark 6 before the test piece has been advanced to the same extent as in the above considered example. The hand of the indicator 9 does not deflect so far and shows a different tolerance group corresponding to the object now gauged.

Since the first calipering element 3 is provided with a calipering surface 4 arranged at an inclination to the guiding surface 1, the variations of displacement of the calipering element 7 and thus also the variations of indication of the indicator 9 are large, even if the variations in the size of the objects gauged are small. The apparatus therefore is of exceptionally great sensitivity which is the greater the less the calipering surface 4 is inclined to the guiding surface 1.

With the device or apparatus described the sensitivity is predetermined and cannot be adjusted.

Fig. 2 illustrates a modified apparatus construction which allows the sensitivity to be adjusted, the electric circuit being omitted for the sake of simplicity. The inclined calipering surface 4a is arranged on a support or body 12 pivotally engaging the associated calipering element 3, said body 12 being capable of being pivoted about an axis 13 arranged parallel to the guiding surface 1 and the distance of said body 12 from the guiding surface being capable of being adjusted by means of a threaded spindle 14. Thus it is possible to adjust the sensitivity of the device in such a manner that the tolerance group lying between two marks 10 of the indicator 9, by way of example, embrace 0.1 mm. or 0.5 mm.

To make the devices according to Figs. 1 and 2 usable for another absolute size of the determining standard dimension a further mark 6a can by way of example be provided on the indicator 5, or a corresponding parallel displacement of the guiding surface 1 may be had.

In principle it is also possible to provide the dial indicator 9 with only a single mark and instead to provide the dial indicator 5 with several marks indicating the tolerance groups.

According to an alternative (not shown) the device could be provided with indicating devices other than dial indicators, for example with such indicating devices bringing about light signals. In such a case the transmission of the displacements of the calipering elements occurring during the calipering operation can also take place at least partly by electrical means, the two calipering elements being in operative connection with electric contact members. At least one of the calipering elements could be replaced by a different gauging element, such as one acting capacitively or inductively.

In Fig. 3 an embodiment of the invention is shown in which the displacements of the calipering elements affect electric current circuits and in which an automatic mechanical sorting of the objects gauged is possible by electro-mechanical means. The calipering element 3 is pivotally connected to a lever 15 adapted as an electrical switch blade, said lever being pivotally held at one end and with the other end capable of reciprocating between two stationary contact elements 16 and 17. The arrangement made is such that the switch blade 15 is in contact with the contact element 16 when no object to be sorted is under the calipering surface 4, however the switch blade comes into contact with the other contact element 17 when the calipering element 3 carries out a certain movement during the calipering operation. Consequently means may further be provided enabling the calipering element 3 to carry out an unimpaired additional movement, even when the blade 15 already bears against the contact element 17. At least the contact element 17 can be adjustably adapted in such a manner that the path of motion of the respective calipering element required by the switch blade to reach the contact element is adjustable.

Electrically insulated the other calipering element 7 is connected to a switch blade 18 which is displaceable in its longitudinal direction, said switch blade coacting with a number of stationary contact elements 19 insulated from each other. The number of these contact elements is equal to the number of tolerance groups less one.

Adjoining the guiding surface 1 there is an inclined slide path 20 formed of several pivotable gates or flaps 21, the number of which is equal to that of the contact elements 19. Each of the flaps 21 has an electromagnet 22 associated therewith for its operation on the energization of which the respective flap is pivoted out of the plane of the slide path. Means (not shown) are provided which have the tendency permanently to pivot the flaps back into the plane of the slide path. Latches 23 coact with flaps 21, in engaged position serving to secure the respective flaps out of the plane of the slide path 20, i. e., at an angular displacement with respect to said slide path. An electro-magnet 24 is provided for each latch and upon energization of the electromagnet the latch is attracted, releasing the flap 21. Because of its pivotal mounting the flap, upon release, pivots back into the plane of the slide path forming a part thereof. At the bottom end of the slide path and in the range of the individual flaps reception elements (not shown) are provided for receiving the sorted objects sliding down the respective portion of the slide path 20.

Each of the stationary contact elements 19 of the calipering element 7 is in electrical connection with one of the terminals of the electro-magnet 22 serving to operate the flaps 21 and that in a continuous sequence, whereas the other terminals of the magnets are joined together and are connected to the plus terminal of a current source 26 through the rest contact of a relay 25, the minus terminal of said current source being grounded. The switch blade 18 of the same calipering element 7 is in electrical connection with the stationary contact element 17 of the other calipering element 3, the switch blade 15 of which is grounded. The same contact element 17 is also connected to one of the terminals of the coil of said relay 25, whereas the other terminal of the relay 25 is in connection with the element of the rest contact of this relay 25 and to the electromagnets 22. The magnets 24 serving for the operation of the latches 23 are all connected in parallel and wired to the plus terminal of the current source, by means of one of their terminals and to the contact element 16 of the calipering element 3 by means of the other of their terminals. A capacitor 27 is connected in parallel with the magnets 24 to retard their attraction. A latch 28 is associated to the relay 25, said latch locking the movable contact element of its rest contact in open position. An electromagnet 29 serves for operating the latch 28 for the purpose of releasing the contact element of the relay contact and is connected in parallel with the magnets 24.

The operation of the described apparatus is as follows: If there is no object to be sorted in the range of the calipering element 3, 4, the switch blade 15 rests on contact element 16 so that the electromagnets 24 and 29 are energized and the latches 23 and 28 are therefore attracted by them. All the flaps or gates 21 are thus in the condition of being released from their respective latches and of being pivoted back into the plane of the slide path 20, rest contact of the relay 25 being closed since its coil is deenergized. The switch blade 18 of the other calipering element 7 is displaced to the left in Fig. 3 and is not in contact with any of the associated contact elements 19.

If an object to be sorted is inserted in the gap between first movable surface 4 and fixed surface 1 and for abutment with the calipering elements 4, 7, the switch blade 18 is displaced gradually over several of the contact elements 19 whereas simultaneously the switch blade 15 is lifted off the contact element 16 and is moved towards the contact element 17. On further advancing the object 2, the switch blade 15 comes finally to lie against the contact element 17 thus grounding contact elements 19 upon contact with switch blade 18 and energization of the associated electromagnets 22 takes place. A part of the flaps or sections 21 therefore pivots out of the plane of the slide path or inclined surface 20 and is held in this position by the associated latches 23 as is shown in Fig. 3. Simultaneously the coil of the relay 25 is also inserted in the electric circuit through the switch blade 15 and the contact element 17 so that the rest contact of said relay again interrupts its own circuit and that of the electromagnets 22. The latches 23 hold the flaps 21 in the outwardly pivoted position and the latch 28 retains the contact of the relay 25 in the open position.

If the calipering object 2 is still further displaced to the right in Fig. 3 no further flaps 21 can be outwardly pivoted in spite of the contacting of further contact elements 19 by the switch blade 18 since the operating magnets receive no current due to the fact that the relay contact at 25 is now open. The object now slides down the inclined slide surface 20 and at the uppermost outwardly pivoted flap 21 drops into the respective reception chamber. As soon as the object leaves the calipering chamber the switch blade 15 again grounds the contact element 16 whereby the electric circuit for the magnets 24 and 29 is again closed which magnets with a certain retardment or delay due to the action of capacitor 27 attract the latches 23 and 28 and again release the contact of the relay 25. The retardment mentioned is chosen in such a manner that the object reaches the respective reception chamber before the flaps 21 are again pivoted back into the plane of the slide surface 20.

The sensitivity of the device, i. e. the absolute size of the tolerance groups, can be adjusted by means of the screw spindle 14. The displacement of the object to be sorted can take place either by hand or mechanically.

The number of tolerance groups can be increased at will.

According to an advantageous alternative example of embodiment of Fig. 3, which is however not illustrated, the disposition is chosen in such a manner that by displacement of the calipering element 7, which serves for selecting the tolerance groups, electric impulses are produced which control a step-by-step switch gear which then in turn influences the various electric circuits to the electro-magnets causing the sorting. Of the impulses produced at least one of each is associated with a certain tolerance group, by way of example in such a manner that on the first impulse the lowest flap 21, on the second impulse the second lowest flap etc. are pivoted outwardly. The generation of the electric impulses can take place directly by means of contact elements or on the other hand also indirectly by induction or capacitively. Likewise it is possible to produce the electric impulses indirectly by means of a light ray and a photo-electrical converter by splitting up the light ray emitted continuously from the light source towards the photo-electrical converter into impulses by an interposed shutter, which shutter is in operative connection with the gauging element 7.

The step-by-step switch gear mentioned, which is controlled by the impulses, can be of any desired type such as a rotary switch according to the type of a line selector in an automatic telephone exchange or a group of relays cooperating with each other.

With the examples described above the test piece 2 was subjected to a translatory displacement along the guiding surface 1 during the gauging operation, in order to contact the gauging element 7. The invention is however not limited to this embodiment. The arrangement in Fig. 1 could be altered in such a manner that the movable surface 8 of the calipering element 7 does not come into contact with the test or work piece 2 but bears against the part having the inclined calipering surface 4 or 4a, said part itself being held in the vertical as well as in the horizontal direction, i. e. held in a plane displaceable at right angles to the surface 1. In this case a stop is provided for the test piece to ensure that it comes to lie in an exactly defined position below the calipering element 3. For carrying out the gauging operation the part lying in the power circuit of the calipering element 3 together with the inclined guiding surface 4 is displaced along the stationary test piece 2 until the hand of the dial indicator 5 reaches the mark 6. The horizontal component of the displacement necessary for this makes itself apparent in a corresponding deflection of the dial indicator 9 on which the tolerance group can finally be read off. Since the horizontal component of displacement of the part having the inclined surface 4 is much greater than the vertical one, the tolerance group can be accurately determined.

In this embodiment, too, the test-piece—as in the case of Fig. 1—serves to contact the two gauging elements 3, 5 and 7, 9 indirectly.

According to a further alternative to Fig. 1 (not illustrated) the inclined guiding surface 4 could also face the calipering element 3, the surface of the respective part facing the test piece being disposed parallel to the guiding surface 1. In this case the part provided with the inclined surface 4 would be displaceable in height only and instead the calipering device 3 in the horizontal direction parallel to the surface 1. The calipering surface 8 of the other calipering device 7 would engage the guide of the calipering element 3. For carrying out the gauging operation by means of the device described, the object to be gauged and possibly to be sorted subsequently is pushed in between the surface 1 and the part having the inclined surface 4 whereupon the calipering element 3 is displaced in the horizontal direction until the contacting of the dial indicator 5 by the inclined guiding surface 4 is so great that the hand of the dial indicator 5 reaches the mark 6. The other dial indicator 9 then indicates the tolerance group of the respective test piece 2 corresponding to the horizontal displacement of the calipering device 3.

An example of embodiment of the gauging and testing device respectively can also be visualized in which instead of the guiding surface 1 there is a guiding surface inclined to the calipering direction of the test piece, said guiding surface being displaceable in a direction inclined both to the calipering direction and to itself, with a test piece displaceable in the vertical direction only and by this displacement contacting the other calipering element 7. In this case the inclined guiding surface can by way of example be the skirting surface of an eccentric the rotation of which acts on the gauging device 9.

The possibilities of execution of the gauging and sorting device according to the present invention are variegated. If the test piece per se is not to be moved or at the most in the direction of its determining dimension, as is described hereinabove, it is sufficient if the displacement is imparted to one of the two elements lying in the power of circuit of the parts calipering the test piece, said displacement being resolved into two components disposed varyingly to each other for the contacting of the two gauging devices, one of said elements having a guiding surface inclined to the direction of displacement and to the direction of the determining dimension and the other being an element contacting this guiding surface. The displacement mentioned may be advantageously carried out in a direction lying in a plane at right angles to the guiding surface, said plane preferably being used for the determining dimension of the test piece.

It is obvious that the objects of the various embodiments of the invention described and illustrated can be combined with each other in any desired manner.

What I claim and wish to secure by Letters Patent is:

1. An apparatus for gauging work pieces for the purpose of classifying same in connection with predetermined tolerance groups, comprising a substantially fixed surface, a first movable surface, said fixed surface and said first movable surface defining a wedge-shaped gap therebetween into which a work piece is to be inserted, a second movable surface for measuring the depth to which said work piece has entered said gap, said second movable surface being provided with an electrical conducting surface forming part of an electric switch, electric circuit means including electromagnet means, a plurality of electrical contacts consecutively engageable by said conducting surface upon movement of said second movable surface, an inclined surface composed of a plurality of sections, each section being pivotally journalled and displaceable relative to the remainder of said inclined surface to provide access to a respective receiving chamber, each of said electrical contacts being connected to said circuit means for operating through said electromagnet means to said sections, respectively, thereby effecting pivotal displacement thereof by causing a predirected flow of electric current in said electromagnet means, whereby the depth to which a work piece has entered said gap will be transmitted by said second movable surface to said electrical contacts, respectively, for effecting pivotal displacement of a corresponding section and permitting access of said work piece to the corresponding receiving chamber, said first movable surface forming a further switch for closing said electric circuit means to thereby operate said sections, and an electric current supply source connected to said electric circuit means.

2. An apparatus for gauging work pieces for the purpose of classifying same in connection with predetermined tolerance groups, comprising a substantially fixed surface, a first movable surface, said fixed surface and said first movable surface defining a wedge-shaped gap therebetween into which a work piece is to be inserted, a second movable surface for measuring the depth to which said work piece has entered said gap, an inclined surface composed of a plurality of sections, each section being pivotally displaceable relative to the remainder of said inclined surface to thereby provide access to a respective receiving chamber, a plurality of electrical circuits consecutively closed by movement of a first switch forming part of said second movable surface, each of said circuits including an electro-magnet adapted to effect pivotal displacement of a corresponding section of said inclined surface thereby providing access to a corresponding receiving chamber, whereby the extent of movement of said second movable surface occasioned by a work piece will cause operation of corresponding circuits, energization of a corresponding electro-magnet and opening of the corresponding receiving chamber due to pivotal displacement of the corresponding section of said inclined surface, said first movable surface actuating a second switch for completing respective electric circuits to a corresponding section.

3. An apparatus for gauging work pieces for the purpose of classifying same in connection with predetermined tolerance groups, comprising a substantially fixed surface, a first movable surface, said fixed surface and said first movable surface defining a wedge-shaped gap therebetween into which a work piece is to be inserted, an electric circuit including power supply means, first switch means connected to said first movable surface and energizing said electric circuit upon displacement of said first movable surface to a predetermined extent, said displacement being effected through insertion of said work piece into said gap, a second movable surface for measuring the depth to which said work piece has entered said gap, spring means for urging said second movable surface into contact with said work piece, a plurality of electrical contacts consecutively engaged by a switch blade forming part of and displaceable by said second movable surface, an inclined surface composed of a plurality of sections, each section being pivotally displaceable relative to said inclined surface to provide access to a respective receiving chamber, electromagnet means in said electric circuit, each of said electrical contacts being operatively connected by respective electromagnet means to said sections of said inclined surface, respectively, for effecting pivotal displacement of predetermined sections by causing closure of said electric circuit, said pivotal displacements being effected only until said electric circuit is energized by insertion of said work piece into said gap, until said predetermined displacement of said first movable surface is effected, whereby upon insertion of said work piece said second movable surface is moved, successively effecting pivotal displacement of said sections upon actuation of predetermined electromagnet means, whereby said electric circuit is energized, further insertion of said work piece causing it to pass onto and along said inclined surface until it encounters a pivotally displaced section and is directed into the corresponding receiving chamber.

4. An apparatus for gauging work pieces for the purpose of classifying same in connection with predetermined tolerance groups, comprising a substantially fixed surface, a first movable surface, said fixed surface and said first movable surface defining a wedge-shaped gap therebetween, measuring means arranged to extend into one end of said gap, and indicator means operatively connected to said first movable surface and actuatable by the latter, said indicator means in a preset position indicating a predetermined gap bounded by said first movable surface and said fixed surface, whereby work pieces of different dimension may be inserted into said predetermined gap for contact with both said surfaces, the respective depths of insertion of said work pieces into said predetermined gap being gauged by said measuring means, thereby determining corresponding tolerance groups of said work pieces.

5. An apparatus according to claim 4, including a pivot support for said first movable surface to thereby adjust the position of said first movable surface relative to said fixed surface, said pivot support extending lengthwise of said fixed surface.

6. An apparatus for gauging work pieces for the purpose of classifying same in connection with predetermined tolerance groups, comprising a substantially fixed surface, a first movable surface, said fixed surface and said first movable surface defining a wedge-shaped gap therebetween, measuring means including a second movable surface operatively connected with said measuring means and arranged to extend into one end of said gap for contact with said work pieces, respectively, and indicator means operatively connected to said first movable surface and actuatable by the latter, said indicator means in a preset position indicating a predetermined gap bounded by said first movable surface and said fixed surface, whereby work pieces of different dimension may be inserted into said predetermined gap for contact with said fixed and said first movable surfaces, the respective depths of insertion of said work pieces into said predetermined gap being gauged by said measuring means through said second movable surface, thereby determining corresponding tolerance groups of said work pieces.

7. An apparatus according to claim 6, including circuit means for an electric current, said depth measuring means including a plurality of electric contacts connected with said circuit means, each of said contacts being consecutively engageable by a switch blade connected with said second movable surface and upon movement of the latter toward said contacts, respectively, said electric contacts upon establishment of engagement with said switch blade serving to cause a predetermined flow of electric current in said circuit means, whereby measurement of the depth to which a respective work piece has entered said gap between said fixed surface and said first movable surface is automatically effected.

8. An apparatus according to claim 7, said electric circuit means being energizable by displacement of said first movable surface due to insertion of a work piece.

9. An apparatus for gauging a work piece for the purpose of classifying same in connection with a predetermined tolerance group, comprising a substantially fixed surface, a first movable surface, said first movable surface being spaced from said fixed surface and forming a gap therebetween, measuring means for indicating a predetermined tolerance group number and including a second movable surface operatively connected with said measuring means, means urging said second movable surface toward said gap, and indicator means operatively connected to said first movable surface and actuatable by the latter, said indicator means being actuated upon insertion of a work piece into said gap, whereby said work piece abuts against said first movable surface and said fixed surface, the classification of said work piece in regard to a tolerance group being determined by the depth of insertion of said work piece into said gap and being indicated by said measuring means upon displacement of said second movable surface relative to said gap.

10. An apparatus according to claim 9, said indicator means including an electric circuit, signal means in said circuit, an electric current supply source connected to said circuit, and switch means, one part of said switch means being operatively connected for movement by said first movable surface, the other part of said switch means for closing said circuit forming a fixed mark of said indicator means whereby both said switch parts upon contact with each other close said circuit and indicate through said signal means formation of a predetermined gap between said first movable surface and said fixed surface for gauging purposes.

11. An apparatus according to claim 9, including means for pivotally supporting said first movable surface, and manipulating means operatively connected with said supporting means to adjust said first movable surface relative to said fixed surface and to said second movable surface.

12. An apparatus for gauging a plurality of work pieces for the purpose of classifying same in connection with predetermined tolerance groups, comprising a substantially fixed surface, a first movable surface, said first movable surface being spaced from said fixed surface and forming a gap therebetween, means controlling at least one chamber for a predetermined tolerance group to which a selected work piece belongs and including a second movable surface operatively connected with said controlling means, means urging said second movable surface toward said gap, and operable means connected to said first movable surface and actuatable by the latter, said operable means being actuated upon insertion of said selected work piece into said gap, whereby said selected work piece abuts against said first movable surface and said fixed surface, the classification of said work piece in regard to the respective tolerance group being determined by the depth of insertion of said work piece into said gap and being regulated by said controlling means upon displacement of said second movable surface relative to said gap.

13. An apparatus for gauging a plurality of work pieces for the purpose of classifying same in connection with predetermined tolerance groups, comprising a substantially fixed surface, a first movable surface, said first movable surface being spaced from said fixed surface and forming a gap therebetween, means controlling at least one chamber for a predetermined tolerance group to which a selected work piece belongs and including a second movable surface operatively connected with said controlling means, means urging said second movable surface toward said gap, operable means connected to said first movable surface and actuatable by the latter, said operable means being actuated upon insertion of said selected work piece into said gap, whereby said selected work piece abuts against said first movable surface and said fixed surface, the classification of said work piece in regard to the respective tolerance group being determined by the depth of insertion of said work piece into said gap and being regulated by said controlling means upon displacement of said second movable surface relative to said gap, said operable means including first switch means, electric circuit means provided with first electrical contacts, an electric power source for said circuit means, said controlling means including second switch means, said circuit means including second electrical contacts operable by said second switch means, an inclined surface extending from said fixed surface downwardly therefrom and including a plurality of sections, each section being pivotally journalled and defining a respective cover for a chamber coordinated to a tolerance group, first electromagnet means, second electromagnet means, both said electromagnet means being connected to said circuit means, said first electromagnet means and said second electromagnet means being, respectively, positioned relative to said sections so that upon energization of a predetermined first electromagnet means through actuation of said first and second switch means a corresponding section will be pivoted to open the respective chamber for receiving a work piece coming from said gap and said inclined surface, while said second electromagnet means upon being energized closes said corresponding section due to further actuation of said first and second switch means upon release of said work piece from said gap and said second movable surface, the respective section thus returning into a position aligned with the remainder of said inclined surface.

14. An apparatus for gauging a selected work piece for the purpose of classifying same in connection with predetermined tolerance groups, comprising a substantially fixed surface, a first movable surface spaced from said fixed surface and forming normally a gap therebetween, means controlling at least one chamber for a predetermined tolerance group to which said selected work piece belongs and including a second movable surface operatively connected with said controlling means, means urging said second movable surface toward said gap, said second movable surface being actuated upon insertion of said selected work piece into said gap, whereby said selected work piece abuts against said first movable surface, said second movable surface and said fixed surface, the classification of said work piece in regard to said predetermined tolerance group being had by the depth of insertion of said work piece into said gap and being regulated by said controlling means upon displacement of said second movable surface relative to said gap, first switch means connected to said first movable surface, electric circuit means provided with a pair of electrical contacts, an electric power source for said circuit means, said second movable surface being provided with second switch means, said circuit means including a plurality of electric contact points operable by said second switch means, an inclined surface extending from said fixed surface downwardly therefrom and including a plurality of sections, each section being pivotally journalled and defining a respective cover for a chamber coordinated to one of said tolerance groups, and electromagnet means connected to said circuit means, respectively, and positioned adjacent said sections so that upon energization of predetermined electromagnet means through establishment of electric contact of said first switch means with one of said pair of electrical contacts and upon actuation of said second switch means for closing said circuit means through predetermined electric contact points a corresponding section will be pivoted to provide access to said respective chamber of said predetermined tolerance group for receiving said work piece when released from said gap and said inclined surface.

References Cited in the file of this patent

UNITED STATES PATENTS

| 2,383,339 | Peterson | Aug. 21, 1945 |
| 2,392,856 | Mortinec | Jan. 15, 1946 |
| 2,417,148 | Wright | Mar. 11, 1947 |
| 2,439,406 | Mortinec | Apr. 13, 1948 |
| 2,448,652 | Aller | Sept. 7, 1948 |
| 2,499,418 | Rinaldy | Mar. 7, 1950 |
| 2,637,116 | Wiebe | May 5, 1953 |

FOREIGN PATENTS

| 203,718 | Switzerland | June 16, 1939 |
| 259,492 | Switzerland | June 16, 1949 |
| 305,751 | Switzerland | Mar. 15, 1955 |
| 538,278 | Great Britain | July 28, 1941 |